March 30, 1954 A. O. ROBERTS 2,673,449
TURBINE-TYPE, FLUID TORQUE CONVERTER
Filed July 19, 1949 6 Sheets-Sheet 4

INVENTOR.
ALBERT O. ROBERTS
BY
ATTORNEY

March 30, 1954     A. O. ROBERTS     2,673,449
TURBINE-TYPE, FLUID TORQUE CONVERTER
Filed July 19, 1949     6 Sheets-Sheet 5

INVENTOR.
ALBERT O. ROBERTS
BY
*Arthur M. Smith*
ATTORNEY

Patented Mar. 30, 1954

2,673,449

UNITED STATES PATENT OFFICE 2,673,449

TURBINE-TYPE, FLUID TORQUE CONVERTER

Albert O. Roberts, Dearborn, Mich.

Application July 19, 1949, Serial No. 105,616

3 Claims. (Cl. 60—54)

The present invention relates to a combination fluid torque converter and transmission and in particular to a hydrokinetic torque converter which includes a combination fluid torque converter and transmission wherein the torque is transmitted by the combined forces from impact of the fluid from the driving to the driven member and the expulsion of the fluid from jets provided in the periphery of the driven member.

The present invention is particularly, but not exclusively, adapted to motor vehicles. In the following specification, it will be described in connection with its use on an automobile. However, it is to be understood that the device may be used wherever it is desired to transmit torque from a driving to a driven member.

Conventional combinations of fluid torque converters and transmissions are characterized by a large number of parts which cooperate in complex relationship to provide all the desired effects and to perform necessary functions. One of the disadvantages of conventional torque converters is that the torque conversion drops off very rapidly when the car attains relatively high speed.

Another disadvantage of certain conventional torque converters is that they never completely cease to transmit a driving force, even at low engine idling speed. Thus, the car will tend to creep unless held by the brake. Another particular fault arising from this same construction, is that no dental shifts may be made from neutral to forward or reverse in the transmission without some braking means to overcome the fluid drag.

In fluid torque converters of conventional design, the fluid must be chosen with regard to its lubricating properties in order to provide proper lubrication for bearings and one-way clutches. Consequently, the fluid is usually relatively light and the flow of fluid required for a given amount of energy transfer is so great that flow losses result in low efficiency. Also, all lubricating oils have a higher viscosity than mercury, and this further reduces efficiency.

Many fluid torque converters now in use are supplemented with bulky gear sets. Further, in all current transmissions known to applicant which are used with torque converters of conventional design, shifting from neutral to forward or reverse necessitates engaging members which are rotating at different speeds. The usual solution to this problem is to provide friction engagement instead of positive toothed or dental engagement. This results in the necessity of at least one oil pump and larger parts.

Therefore, it is a principal object of the present invention to provide a combination fluid torque converter and transmission of simple and compact design which requires a relatively small number of parts and which is readily adapted to mass production at low cost.

It is another object of the present invention to provide a combination fluid torque converter and transmission which requires only reverse gearing and eliminates gearing for forward and neutral positions, thus simplifying the construction and reducing the size of the unit.

A particular object of the present invention is to provide a fluid torque converter which is so constructed as to efficiently utilize a maximum amount of kinetic energy created in the converter fluid and wherein the driven member not only absorbs energy from the fluid by impact but also continues further after impact to utilize the residual energy in the fluid by passing the fluid through small jets or orifices in the driven member to create a jet reaction effect and advantageously expend the residual energy.

It is another object of the present invention to provide a fluid torque converter which combines a transfer of kinetic energy by impact of fluid in the usual manner with a jet propulsion effect created in the driven member by the expulsion of the converter fluid through jets provided in the said driven member, thus effecting a quick conversion of torque even at high speeds when the driving member is accelerated.

It is another object of the present invention to provide a simple and compact fluid torque converter wherein the converter fluid need not possess lubricating properties, and which accomplishes an automatic overdrive.

It is another object of the present invention to provide a combination fluid torque converter and transmission which avoids the danger of accidental shifting between forward and reverse speeds when the members of the transmission are in motion, by providing a centrifugally operated lock.

It is a further object of the present invention to provide a combination fluid torque converter and transmission which utilizes a ball clutch which may be easily shifted under load.

It is a further object of the present invention to provide a combination fluid torque converter and transmission which contains means for locking the transmission so that the vehicle may be parked in an immovable position with the engine running.

Other objects of this invention will appear in the following description and appended claims, reference being had to the accompanying drawings forming a part of this specification wherein like reference characters designate corresponding parts in the several views.

In the drawings:

Fig. 9 is a sectional view taken along the line 9—9 in the direction of the arrows, Fig. 2.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The construction of a torque converter and transmission embodying the present invention includes the fly wheel housing 13, the converter housing 23, and the transmission housing 77 secured together in that order. A fly wheel 78 of any conventional design is contained in the fly wheel housing 13 and secured to the input shaft 38 which is connected to the power source.

The converter

Figure 1:
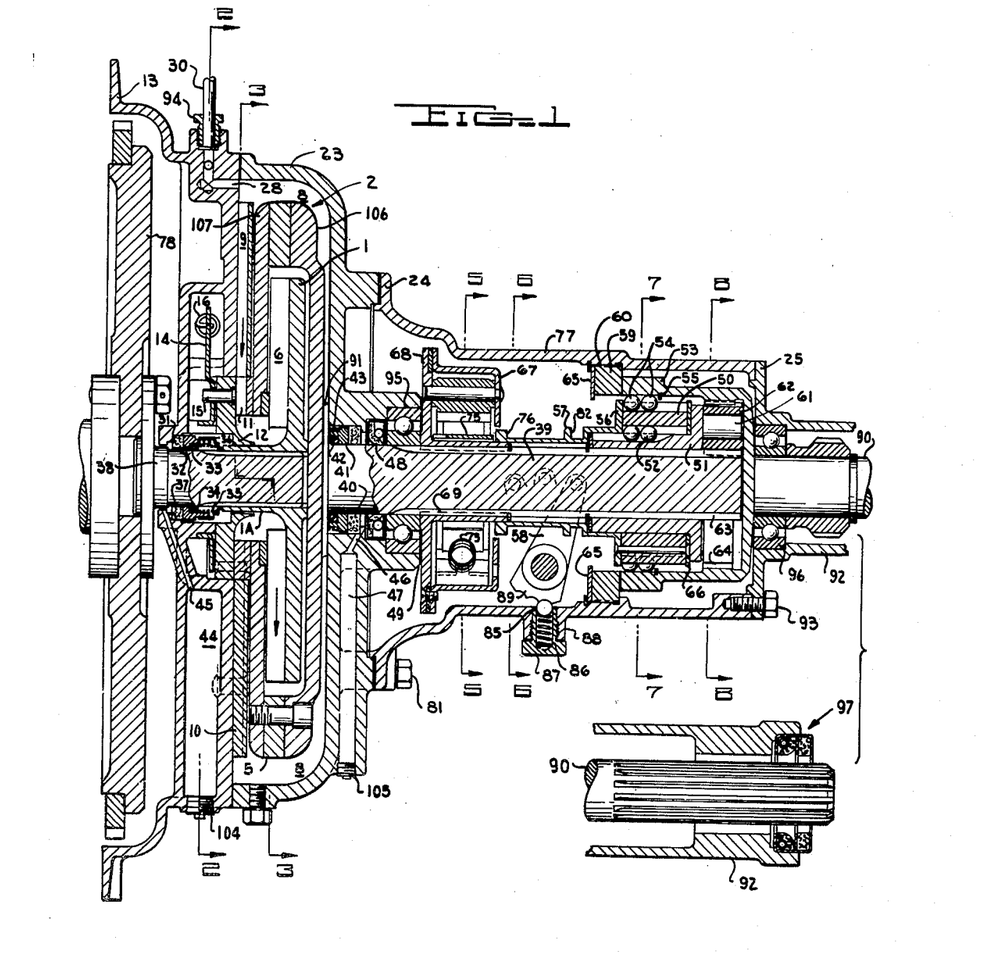
Fig. 1 is an elevational side section taken along the line 1—1 in the direction of the arrows, Fig. 2.

A driving member or impeller 1, having a hub 1a which is splined to the input shaft 38, is disposed within the converter housing 23. The said impeller 1 is provided with the passages 6 which are curved toward the direction of rotation of the input shaft 38. Disposed concentrically around the impeller 1 is the driven member or runner 2 which is connected to the intermediate shaft 39. As seen in Fig. 1, the runner constitutes a rear plate 106, a forward plate 107, and runner blocks 5 bolted therebetween. Referring to Figs. 3, 4, 10 and 11, it can be seen that said runner blocks 5 are separated by the passages 7. Each block 5 is pierced at 79 and provided with the slot 80. At the outer end of each passage 7 is the orifice or jet 3.

Disposed adjacent the runner 2 within the converter housing 23 is the stator plate 10 which is riveted to the fly wheel housing 13. An annular stator valve 11 is located at the center of the stator plate 10. This valve 11 is secured to the valve hub 12 which is disposed around the hub 1a of the impeller 1. The valve hub 12 is connected by the pins 15 to the valve control arm 14 which is located in the fly wheel housing 13. In the driving position of applicant's device, shown in the drawings, the valve hub 12 is held by spring 16 against stop pin 17. This feature is most clearly seen in Fig. 2. An adjustable attaching member 98 is screw-threaded on the end of the solenoid arm 99. A rod 100 extends from the attaching member 98 through the guide 101 to a hooking engagement with the control arm 14. One end of the spring 16 is hooked to the control arm 14 and the other end is screwed into internal threads in the head 102 which is disposed within the removable cover 103. An input shaft seal is provided which is composed of the carbon ring 31, steel sealing ring 32, rubber O ring 33, washers 34, spring 35, and retainer 36. Carbon ring 31 is pressed into fly wheel housing 13 and does not rotate. It has a flat surface 37 against which the super-finished surface of sealing ring 32 is held by pressure from spring 35. Sealing ring 32 rotates with the shaft 38, being driven by the retainer 36 which has teeth meshing with notches in the hub 1a of impeller 1, and inwardly extending fingers which extend into notches in the said sealing ring 32.

The transmission

The transmission housing 77 is secured to the converter housing 23 by the bolts 81 which extend through the flange 24 in said transmission housing 77. An intermediate shaft 39 is disposed within the said housing 77 and has a seal at one end similar to the input shaft seal previously described. This seal consists of the carbon ring 40 pressed into converter housing 23, seal ring 41, rubber O ring 42, and spring 43. The ends of spring 43 are bent and inserted into drilled holes (not shown) in the shaft flange 91 and the seal ring 41 to insure that seal ring 41 will rotate with shaft 39. A leather seal 48 is provided to prevent transmission lubricating oil from leaking into the converter. Very little oil will reach this seal on account of the centrifugal effect when shaft 39 is rotating, and the close clearance at 49. A ball bearing 95 of conventional design is fitted adjacent the shaft seal on the shaft 39.

Figure 8:
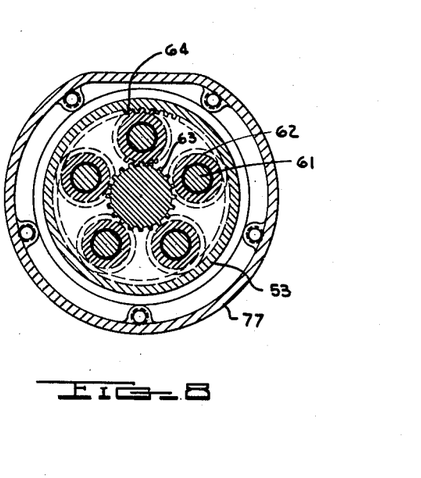
Fig. 8 is an elevational section taken along the line 8—8 in the direction of the arrows, Fig. 1.

In Fig. 1, at the right end of the intermediate shaft 39, and affixed thereto within the transmission housing 77 is shown a sun gear 63. The teeth of the sun gear 63 mesh with the teeth of the planet pinions 62. Five of such pinions are shown in Fig. 8. The said pinions 62 also mesh with a ring gear 64 formed on the inner wall of the driving bell 53. The driving bell 53 is formed on or attached to the end of output shaft 90. A planet carrier 51 is mounted on the intermediate shaft 39 and furnishes the journals 61 for the planet pinions 62. A cam 50 is disposed on said carrier 51 and is supported in place by the end plate 66 and the flange 56 of a shifter collar 57. The carrier 51 is ball splined to the cam 50 by the balls 52 and thus always rotates with the said cam 50. The clutch balls 54 are provided to transmit torque and are held in place by the snap ring 55.

Figure 6:
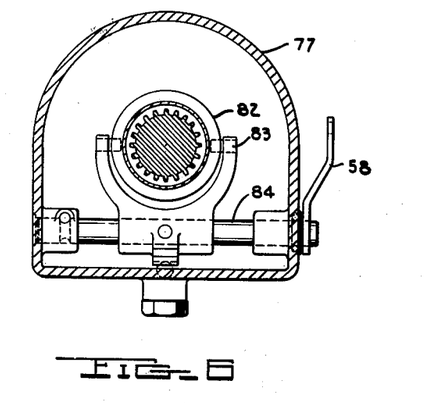
Fig. 6 is an elevational section taken along the line 6—6 in the direction of the arrows, Fig. 1.
Figure 7:
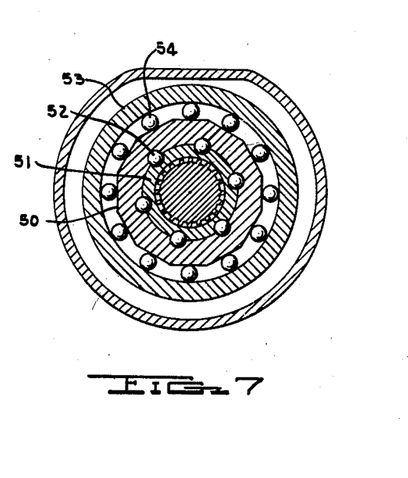
Fig. 7 is an elevational section taken along the line 7—7 in the direction of the arrows, Fig. 1.
Figure 12:
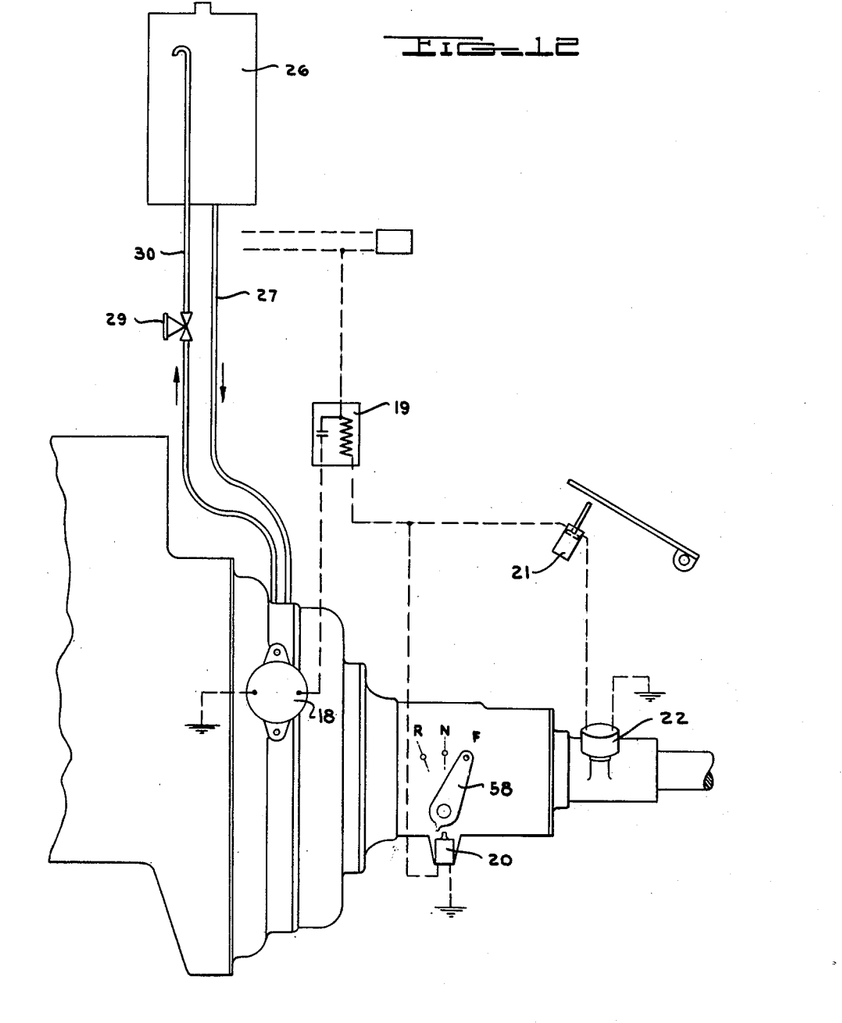
Fig. 12 is a schematic wiring and piping diagram of the present invention.

The shifter collar 57 is disposed adjacent the ball clutch mechanism and is shown in Figs. 1 and 6. The shift lever 58 is connected with the annular groove 82 by the pins 83. The shift lever 58 is positioned on the shaft 84 which is disposed in the transmission housing 77. A ball 85 is seated on the end of spring 86 which is positioned in a keeper 87. The said keeper 87 is screw-threaded into a boss 88 formed as a part of the transmission housing 77. The bottom portion of the shift lever 58 is provided with the notches 89 so that the shift lever will be firmly seated in position under spring tension when it is moved from one position to another. The positions of the shift lever 58 for forward, neutral or park, and reverse are indicated in Figs. 1 and 12.

Figure 5:
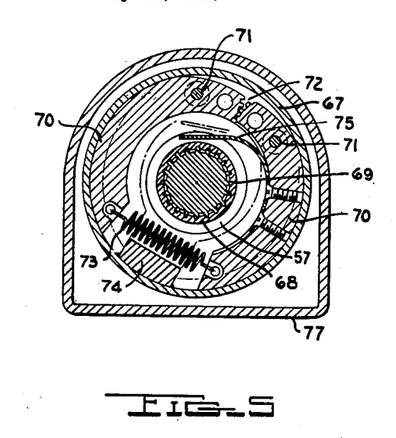
Fig. 5 is an elevational section taken along the line 5—5 in the direction of the arrows, Fig. 1.

Referring to Figs. 1 and 5, governor housing 67 is bolted to governor hub 68 which is splined to shaft 39 at 69. The governor revolves at output speed when in forward and at 2¾ times output speed when in reverse. Governor fly weights 70 are pivoted at 71 and mesh together at gear segments 72. Therefore, they must move in unison and balance is preserved. A light spring 73 holds the weights 70 to their inward position when the car is stopped. Block 74 is used as a stop for the inward position of the fly weight and also as a balance weight. Lock spring 75 is attached to one of the fly weights 70. Except at very low car speeds, the fly weights stand in the outer position shown and lock spring 75 is in a position to block any attempted axial movement of shifter collar 57. If the shift collar 57 is in the reverse position, the locking action is at shoulder 76 on the collar 57. The friction at the small pivots 71 will be practically eliminated by the slight movement of the weights during slow motion, so the spring 73 can be very light and therefore the lock will swing into place as soon as the car is started.

As shown in Fig. 1, the output shaft 90 is disposed within the housing 92. The output shaft housing 92 is provided with the flange 25 for attachment to the transmission housing by the bolts 93. A ball bearing 96 of conventional design is fitted within the shaft housing 92 on the output shaft 90.

A seal 97 is located in the end of the shaft housing 92 to prevent oil leakage around the end end of the said shaft housing 92. The end of the output shaft 90 is splined for engagement with a drive shaft or other driving connection. Such a connection would be suitably housed in a housing or the like at the end of the shaft housing 92, and extend into the seal 97.

Figure 2:
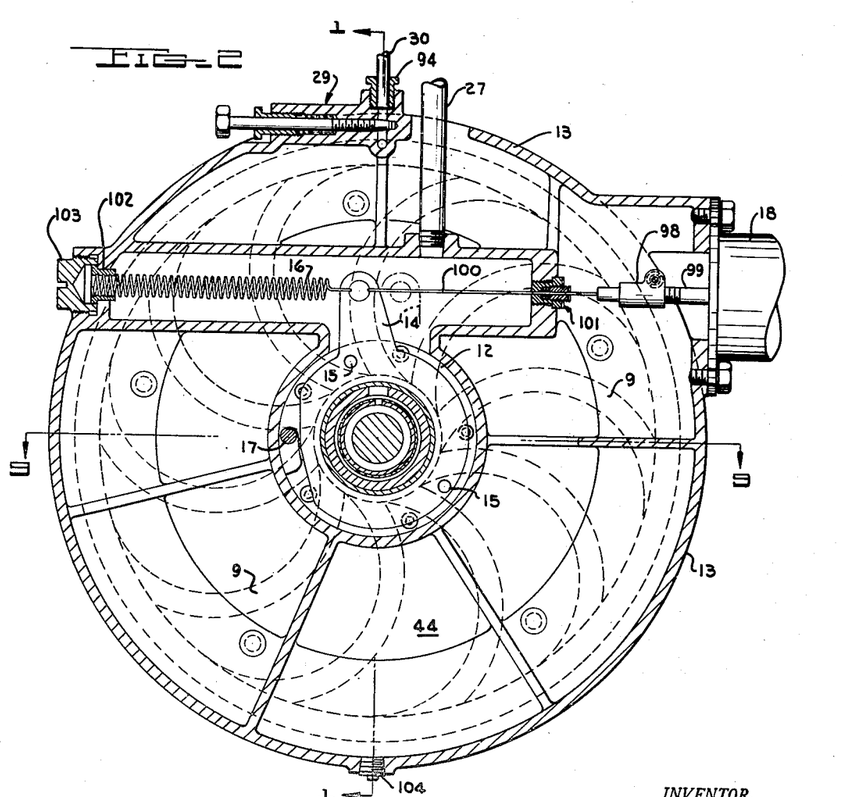
Fig. 2 is an elevational section taken along the line 2—2 in the direction of the arrow, Fig. 1.
Figure 3:
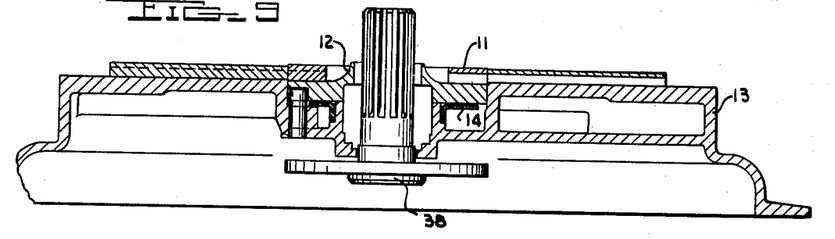
Fig. 3 is an elevational section taken along the line 3—3 in the direction of the arrows, Fig. 1.
Figures 3, 4:
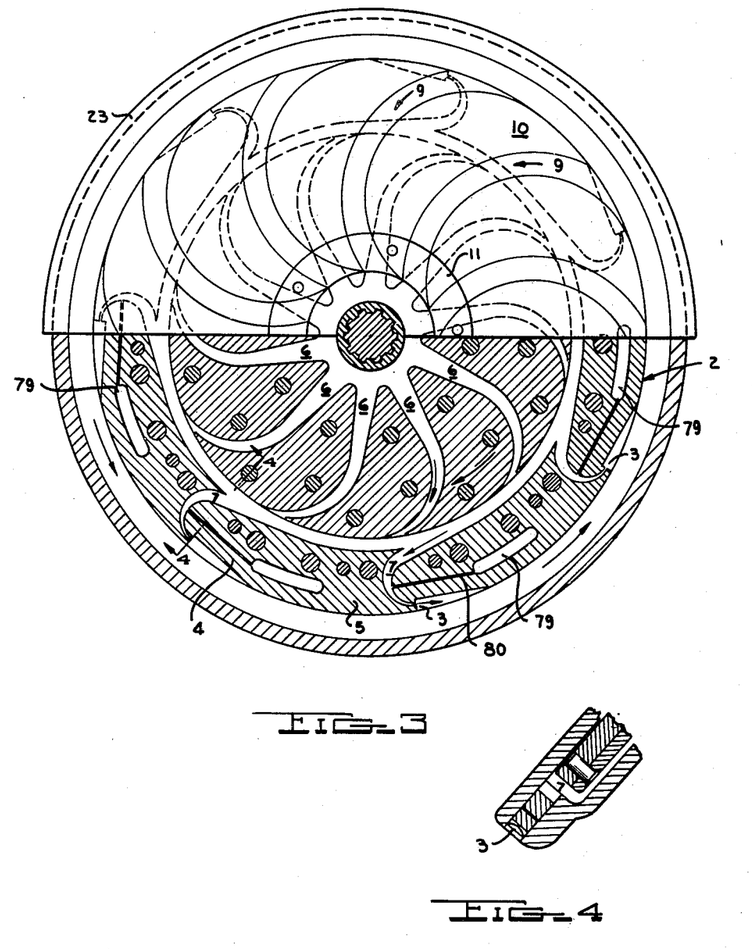
Fig. 4 is a sectional view taken along the line 4—4 in the direction of the arrows, Fig. 3.

An inlet tube 27, Fig. 12 and Fig. 2, leads from the reservoir 26 and is detachably secured to the flywheel housing 13. An escape tube 30 is secured to the top of the flywheel housing 13 by the screw-threaded guide 94. A passage 28 in the flywheel housing 13 leads to the annular chamber 8 in the converter housing 23. A bleeder valve 29 of conventional construction is disposed at the outlet in the escape tube 30.

A leakage reservoir 44 is provided in the flywheel housing 13. Drilled holes 45, 46 and 47 are provided to conduct any leaking converter fluid to the leakage reservoir, 44. A passage (not shown) is provided between the hole 47 and the reservoir 44. Plugs 104 and 105 are provided at the bottom of the leakage reservoir 44 and hole 47 to allow drainage of any converter fluid which may leak from the system.

Jet construction

Figure 10:
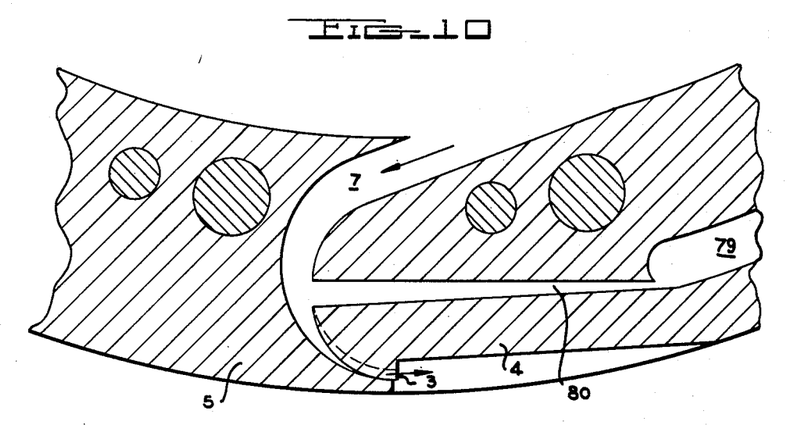
Fig. 10 is an enlarged sectional view of a runner block of the present invention showing the jet in the closed position.
Figure 11:
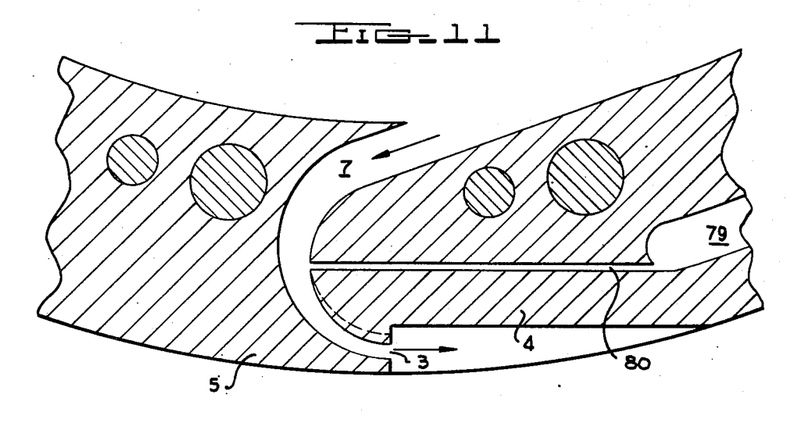
Fig. 11 is a sectional view of a runner block of the present invention showing the jet in the open position.

The orifice area of the jets is variable and the portion 4 of the runner block 5 is in effect a cantilever beam. Centrifugal force plus increasing fluid pressure causes the end of this beam to move outward, reducing the orifice area. The purpose of this is to keep the quantity of flow constant, even though with increase in angular velocity of the runner the pressure and the jet velocity relative to the runner will increase. Fig. 10 shows the jet structure when the runner is revolved at a high R. P. M., the cantilever arm 4 being moved outward by centrifugal force. Fig. 11 shows the jet structure at low runner R. P. M.

Filling the converter unit

The converter housing 23 is completely filled at all times with fluid under slight pressure. Reservoir 26 (Fig. 12) is located as high as practicable above housing 23. During filling, the fluid flows down through the tubes 27 shown in Figs. 1 and 12. The air escapes through hole 28, bleeder valve 29, and the tube 30. Valve 29 is also used for controlling circulation of a small amount of fluid through the reservoir for cooling.

Converter fluid

Since there are no bearings nor one-way clutches in this converter, the fluid can be selected without regard to its lubricating properties. The fluid should be of low viscosity for best efficiency and it should be as heavy as possible in order to keep the unit small and compact. Also, the fluid should be heavy for the purpose of reducing flow losses. With light fluids, the quantity of flow required for a given amount of energy transfer is so great that the flow losses result in low efficiency.

For the above reasons the accompanying drawings show a design suitable for the use of mercury as the fluid and designed for 190 lb. ft. input torque. The specific gravity of mercury is 13.6 and that of mineral oils is about .92. Therefore, mercury is nearly fifteen times as heavy as oil. As designed for mercury, the runner diameter is 11 inches and the width of the passages is .40 inch. If the diameters were maintained and the width increased for the use of oil, the passages would be .4 times 15, or 6 inches wide. If the widths were maintained and the diameter increased, the turbine diameter would be about $$\sqrt[5]{15 \times 11^5} = 18.9$$

inches for oil instead of 11 for mercury. This formula is used because of the well known fact that the capacity varies with the fifth power of the diameter. The compactness and simplicity of the design of the present invention will offset the cost of using mercury instead of oil. Further the mercury will not be lost nor consumed, it may be reclaimed from the device after its mechanical parts are worn out.

Fluid circuit

The passages 6 in impeller 1 (the driving member) are curved in a forward direction in order to increase the tangential velocity of the fluid leaving the periphery of the said impeller 1. The kinetic energy of this flow when it enters passages 7 is transferred to the turbine or runner 2 (the driven member). The fluid passes through the passages 7 and changes direction, being expelled at the orifices or jets 3 in a substantially different direction than which it entered. Thus, the kinetic energy which is transferred from the impeller to the runner on impact, plus the reaction force of the jets will produce a high torque in the runner 2 when it is stalled.

Closing the fluid circuit

The torque converter and transmission of the present invention has a valve 11 in the stator 10, which automatically closes when the engine is idling. This stops all circulation of the fluid. The impeller 1 may produce a pressure, but there is no fluid moving into the runner 2 or out of the jets 3. Therefore, no power can be transmitted when the valve 11 is closed. The closed valve 11 is the only "neutral" required.

The valve 11 automatically closes and stops all circulation of fluid when the engine is idling. By moving control 14 against the tension of spring 16, the stator passages 9 are closed, thus cutting off circulation of the hydraulic fluid. In the driving position, shown in the drawings, the stator passages 9, are wide open to allow free circulation of the fluid. The passages are closed by energizing the solenoid 18 which overcomes the spring 16 and closes the passage 9.

The seals

The fluid pressure within the annular chamber 8 in the converter will at times be very high, but near the central axis where the input shaft 38 is located, the pressure will always be low. The rubber O rings 33 prevent any leakage between the seal ring 32 and the input shaft 38. Any fluid escaping from the fluid circuit when the converter is in operation would have to move inwardly toward the axis of rotation between the closely fitted surfaces of the carbon ring 31 and steel sealing ring 32, and in doing so would be moving against centrifugal force.

The seal at the intermediate shaft 39 is substantially the same as the seal on the input shaft 38.

No leakage can occur at either of these seals while rotating as described above. If any leakage occurs while standing, it will be conducted to the leakage reservoir 44 by drilled holes 45, 46, and 47. A passage (not shown) is provided between the hole 47 and the reservoir 44.

Control

The wiring diagram for the control of the device of the present invention is shown in Fig. 12. Current from the ignition switch passes through relay 19 to the solenoid. The relay 19 is closed either by shifting to neutral (switch 20) or by releasing the accelerator (switch 21). The accelerator switch 21 becomes inoperative above 20 miles per hour when governor switch 22 is open. This prevents the disengagement of the drive when the accelerator is released at all speeds above 20 miles per hour. When the car is brought to a stop, the drive is disengaged by the accelerator when it is released. If the manual shift 58 is moved to the neutral position, the drive still remains disengaged even when the accelerator is depressed.

The ball clutch

The provision of a means in the converter for stopping the fluid flow (valve 11) makes it unnecessary to provide a neutral. Therefore, it is feasible to use the unique ball clutch shown in the drawings. This clutch is as positive as a dental clutch but will engage easily and quietly regardless of the relative angular positions of the members being coupled together. Dental clutches refuse to engage when the teeth happen to be directly in line and the teeth make an unpleasant noise when there is any relative motion of the members being coupled.

The ball clutch of the present invention is similar to a roller type freewheel clutch except that the cam 50 is designed to drive in both directions instead of driving in one direction and freewheeling in the other. Furthermore, hardened steel balls are used instead of rollers. This makes it possible to manually move the cam axially whether it is loaded or not.

A double row of balls is disposed between cam 50 and the internal cylindrical surface of the driving bell 53 when the shift lever is in forward position. The balls are under slight preload, i. e., they are in frictional contact with cam 50 and driving bell 53. Torque applied in either direction causes the balls to wedge tighter as they roll on the cam, thus effecting a driving connection. When the shift lever is moved to the reverse position, cam 50 moves axially and the balls roll out of the forward driving bell 53 and into the stationary reaction member 59. If the shift lever is moved to the parking position, halfway between forward and reverse, then one row of balls is in the reverse reaction member 59 and the other row is in the forward driving bell 53, thus positively locking the vehicle against rollaway.

A dental clutch could not be used in this way with a car parked on an incline, because the load on the teeth would make it very difficult to disengage them. The clutch balls 54 and the spline balls 53 will roll easily in an axial direction regardless of load.

General operation

The device of the present invention provides a unique and efficient torque converter having its action modified or channeled by a simple planetary transmission. A broad description of the general operation of the torque converter and transmission of the present invention is as follows:

Torque from the power driven input shaft 38 is transferred from the impeller 1 (which is keyed to the input shaft 38) to the runner 2 by the impact of the power transmitting fluid which is forced through the passages 6 of the impeller 1 and into the passages 7 of the runner 2. The power transmitting fluid is expelled through the jets 3 in the runner 2 to increase the torque. The runner 2 is directly connected to the intermediate shaft 39 at the flange 91 and the torque is thus transmitted to said intermediate shaft 39. The torque is then transferred through the balls 54 of the ball clutch to the bell 53 when the shift lever 58 is in the forward position. The said bell 53 is connected directly to the output shaft 90. The intermediate shaft 39 is then the driving shaft with respect to the driven shaft 90. When the balls 54 of the ball clutch are moved out of engagement with the bell 53 by moving the shift lever 58 to the reverse position, the torque is transmitted through the sun gear 63 (which is secured to the end of the intermediate shaft 39), to the plurality of planet pinions 62, and thus to the ring gear 64 which is formed on the inner wall of the bell 53. It will readily be seen that the transfer of the motion through the planet pinions will transmit a reverse motion to the bell 53 and consequently the output shaft 90 to which the said bell 53 is secured.

Operation in idling position

When the engine is idling, the stator valve 11 closes the ports to the stator passages 9 and thus prevent circulation of the fluid through the runner 2 and out of the jets 3. Therefore, no power can be transmitted when the valve 11 is closed. Referring to Fig. 12, the solenoid 18 is energized when the relay 19 is closed and current from the ignition switch passes therethrough. The relay 19 is closed either by shifting to neutral (switch 20) or by releasing the accelerator (switch 21). If the manual shift 58 is moved to the neutral position, the drive still remains disengaged although the accelerator may be depressed, since the switch 20 closes the circuit even though the switch 21 is open.

*Operation in low forward speed*

When the combination torque converter and transmission is operated from a stand-still position, the accelerator is depressed and the switch 21 is opened. The shift lever 58 is in the forward position, so the switch 20 is also open. Thus the circuit through the solenoid 19 is open and the stator valve 11 is in the open position allowing circulation of the fluid. As the impeller 1 is rotated, the fluid is transferred through the passages 6 and into the chambers 7 of the runner 2. This impact transfers kinetic energy, and when the fluid is expelled through the jets 3 in the passages 7 an increase in torque is effected. Thus, the impact force plus the jet reaction force produce a high torque in the runner 2.

As the runner 2 speeds up, the torque conversion between the impeller 1 and runner 2 will diminish. When the runner 2 attains the same speed as the impeller, the jets alone do the driving and the torque ratio is 1 to 1. Then, if the load will permit, the runner 2 will begin to rotate faster than the impeller 1. The fluid leaving the runner 2 through the jets 3 does not strike vanes as it does in the usual torque converter, but instead is allowed to follow a circular path in the chamber 8. Its motion is backward because the jet velocity is higher than the peripheral velocity of the runner 2. Leaving the circular chamber 8, the fluid enters passages 9 in stator plate 10. It is not necessary to freewheel the stator 10 because the fluid entering it is never moving in a forward direction. Therefore, the stator 10 is riveted to the flywheel housing 13 instead of being mounted on a freewheel clutch as is the case in some torque converters.

The stator passages 9 change the direction of the fluid flow from backward to forward and lead the fluid back to the impeller 1. Thus, the fluid enters the impeller 1 in a direction to assist rather than hinder the rotation. In all torque converters, the ability to produce an output torque which is greater than the input torque is the result of backward discharge of fluid from the runner (driven member). This is also true of the present unit. Since it discharges fluid backward at its outer periphery rather than near the center of rotation, the increase in torque will be considerable. The stator 10 receives the backward flowing fluid and changes its direction. This produces a backward reaction in the stator 10. The output torque is equal to the input torque plus this reaction force.

*Operation in high forward speed*

As the speed of the runner 2 is increased, centrifugal force will force the cantilever arms 4 of the runner blocks 5 to move outwardly and decrease the openings in the orifices 3. Thus, the pressure and the jet velocity relative to the runner 2 will increase. The extreme positions of the cantilever arm 4 are shown in Figs. 10 and 11 of the drawings. Fig. 10 shows the position of the arm 4 at high R. P. M., and Fig. 11 shows the position of the arm 4 at low R. P. M. The shift lever 58 is in the "forward" position and the switch 20 is open. The accelerator pedal is down and thus the switch 21 is also open. Thus the circuit through the solenoid 19 is open and the stator valve 11 is in the open position allowing circulation of the fluid.

The propulsive effect of the jets 3 is independent of the speed of rotation of the runner 2. Therefore, torque conversion can be realized at higher car speeds instead of dropping off very rapidly when the car begins to accelerate as conventional torque converters do. For this reason, the runner 2 will at times be driven faster than the impeller 1 and an overdrive is accomplished.

*Operation in reverse*

In reverse operation, the shift lever 58 is shifted to the reverse position and the accelerator is released. Thus, the switch 20 is open, but the switch 21 is closed. The circuit to the solenoid 19 is closed through the said switch 21 and there is no transmission of power since the stator valve 11 is closed and there is no circulation of fluid. As the accelerator is depressed, the switch 21 is opened, the solenoid 19 is deenergized, and the stator valve 11 is moved to the open position. Thus, the fluid is allowed to circulate and the torque converter becomes operative.

*Operation of the ball clutch*

Fig. 1 shows the ball clutch is a forward drive position. In this position the ball clutch locks the gear set including sun gear 63, planet pinions 62, and ring gear 64, and the entire unit moves together. The drive is accomplished through the intermediate shaft 39, the sun gear 63, the locked planet pinions 62, the carrier 51, the ball spline 52, the cam 50, the balls 54, the bell 53, and the output shaft 90.

As the shift lever is moved to the "park" position, the clutch balls 54 move ½ as far as the shifter collar 57 and will stop with one set of balls 54 still locking the bell 53 and the other set of balls 54 locking the planet carrier 51 to the reverse reaction ring 59. The said ring 59 is permanently anchored to the housing 77 by the serrations 60. In this position the car cannot move. However, the engine can be freely operated, because the fluid cannot circulate due to the closed position of the stator valve 11 which is actuated by gear shift switch 20 previously described and shown in the wiring diagram, Fig. 12.

When the shift lever 58 is moved to the "reverse" position, both sets of clutch balls 54 will engage the reverse reaction ring 59. This holds carrier 51 stationary. The journals 61 upon which the planet pinions 62 revolve are integral with the carrier 51, so sun gear 63 will drive ring gear 64 backward through the planet pinions 62. In the reverse position, the balls are held in place axially by plates 65 and 66.

From the foregoing specification it will readily be seen that I have invented a simple and efficient combined fluid torque converter and transmission. The device of the present invention embodies many features and improvements which make it more practical and effective than conventional torque converters and transmissions. Such devices as oil pumps, braking assemblies and bands, multiple stators and accompanying free wheeling assemblies, multiple pumps or impellers, and servo units are eliminated in providing a simple construction easily adapted for manufacture and assembly by mass production methods at relatively low cost.

Having thus described my invention, I claim:

1. A torque converter including a smooth-walled converter chamber, a driving member within said converter chamber rotatable in one direction only, a driven member disposed concentrically around said driving member in the same plane as said driving member and rotatable in the same direction as said driving member, and a fluid adapted to transfer torque from said driving member to said driven member, said driven member comprising a pair of axially spaced annular rings having a plurality of spaced apart runner blocks disposed therebetween, said runner blocks being curved at both ends so that each pair of adjacent runner blocks forms a passage through the driven member curved in opposition to the direction of rotation and terminating in a jet at the periphery of the driven member, each of said runner blocks being split to provide a cantilever beam which will move to restrict the said passage and jet as the speed of rotation increases to expel said fluid under a proportionately increased pressure into the smooth-walled converter chamber in an unimpeded circular path opposite to the direction of rotation.

2. A torque converter as claimed in claim 1 wherein the said driving member has passages therein which curve outwardly in the direction of rotation of the said driving member.

3. A torque converter as claimed in claim 1 and further characterized by the provision of a non-rotatable stator plate adjacent said driving and driven members and having passages curving outwardly in the direction of rotation of the driving member and in communication with the passages in said driving and driven members so that the fluid is returned from the driven member to the driving member without impeding the rotation of the same.

ALBERT O. ROBERTS.

References Cited in the file of this patent

UNITED STATES PATENTS

| Number | Name | Date |
|---|---|---|
| 38,707 | Watson | May 26, 1863 |
| 60,052 | Phillips | Nov. 27, 1866 |
| 95,837 | Reaney | Oct. 12, 1869 |
| 975,795 | Radcliffe | Nov. 15, 1910 |
| 1,062,876 | Blymyer | May 27, 1913 |
| 1,773,985 | Fraser | Aug. 26, 1930 |
| 1,806,652 | Sperry | May 26, 1931 |
| 1,888,881 | Murphy | Nov. 22, 1932 |
| 2,014,944 | Martyrer | Sept. 17, 1935 |
| 2,067,457 | Morgan | Jan. 12, 1937 |
| 2,067,793 | Seibold | Jan. 12, 1937 |
| 2,081,581 | Fawick | May 25, 1937 |
| 2,096,070 | Sinclair | Oct. 19, 1937 |
| 2,104,608 | Cox | Jan. 4, 1938 |
| 2,134,398 | Cotterman | Oct. 25, 1938 |
| 2,168,862 | De Lavaud | Aug. 8, 1939 |
| 2,168,863 | De Lavaud | Aug. 8, 1939 |
| 2,237,944 | Maurer | Apr. 18, 1941 |
| 2,339,626 | Duffield | Jan. 18, 1944 |
| 2,354,596 | Jandasek | July 25, 1944 |
| 2,376,699 | Jandasek | May 22, 1945 |
| 2,377,009 | Heyer | May 29, 1945 |
| 2,392,520 | Benz | Jan. 8, 1946 |
| 2,438,620 | Russell | Mar. 30, 1948 |

FOREIGN PATENTS

| Number | Country | Date |
|---|---|---|
| 28,507 | Great Britain | Dec. 13, 1906 |